United States Patent
Kikuchi et al.

(10) Patent No.: US 6,706,221 B1
(45) Date of Patent: Mar. 16, 2004

(54) PLASTIC OPTICAL FIBER END FACE TREATMENT METHOD

(75) Inventors: Kimihiro Kikuchi, Miyagi-ken (JP); Takehiko Tomizawa, Miyagi-ken (JP); Yoshihiko Hirama, Miyagi-ken (JP); Kengo Yamada, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 281 days.

(21) Appl. No.: 09/611,717

(22) Filed: Jul. 6, 2000

(30) Foreign Application Priority Data

Jul. 8, 1999 (JP) .......................................... 11-194577

(51) Int. Cl.[7] .............................................. B29D 11/00
(52) U.S. Cl. ...................... 264/1.24; 264/2.7; 264/294; 264/319
(58) Field of Search .................. 264/1.24, 2.7, 264/1.26, 248, 294, 296, 319; 425/392, 808; 156/394; 66/305

(56) References Cited

U.S. PATENT DOCUMENTS 4,510,005 A * 4/1985 Nijman ...................... 156/221
5,044,721 A * 9/1991 Nakamura ................... 385/53
5,770,132 A    6/1998 Yamamura et al.
5,966,485 A * 10/1999 Luther et al. ................ 385/85

FOREIGN PATENT DOCUMENTS

| EP | 0 666 486 A1 | * | 8/1995 |
| JP | 06-67032 | * | 3/1994 |
| JP | 09033731 A | * | 2/1997 |
| JP | 11223732 A | * | 8/1999 |
| WO | WO9507795 A | * | 3/1995 |

* cited by examiner

*Primary Examiner*—James P. Mackey
*Assistant Examiner*—Donald Heckenberg
(74) *Attorney, Agent, or Firm*—Brinks Hofer Gilson & Lione

(57) ABSTRACT

An end face of a plastic optical fiber end is treated so as not to extrude to the core side face when the plastic optical fiber end is softened and fused. The core end face of the plastic optical fiber end is pressed intermittently on a mold that is heated to a certain temperature to soften and fuse the core end face to thereby transfer the transfer face of the mold on the core end face.

9 Claims, 11 Drawing Sheets

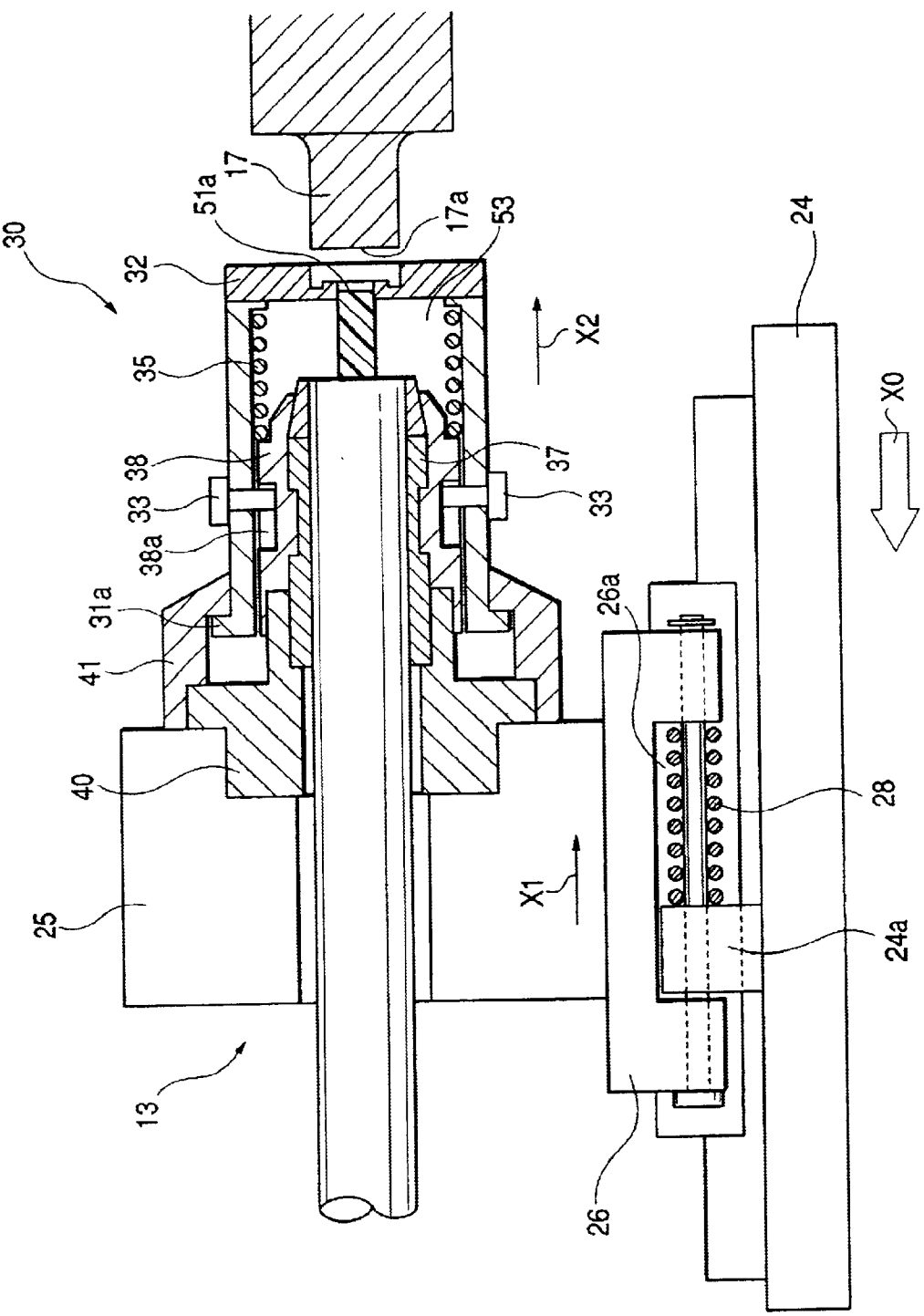

PLASTIC OPTICAL FIBER END FACE TREATMENT METHOD

BACKGROUND OF THE INVENTION

1 Field of the Invention

This invention relates to a plastic optical fiber end face treatment method and a treatment device, and more particularly relates to a treatment method and a treatment device that are suitable for forming a shape of a lens face on the end face of a plastic optical fiber.

2 Description of the Related Art

Conventionally, when an end face of an end of a plastic optical fiber is treated, the end of the plastic optical fiber is brought close to a high temperature source and the end is treated. For example, as shown in FIG. 9, a method in which using an end face treatment device for treating an end face 53 of a plastic optical fiber 50 provided with a chuck 60 for fixing an plastic optical fiber having a jacket with an exposed core end face 51a, a transfer face 62a at its end, and a metal mold 62 that is heated by means of a heater 61, a plastic optical fiber end 53 is held with the chuck 60 and moved toward the mold 62, the heated mold 62 is pressed against the core end face 51a of the plastic optical fiber end 53, the core end face 51a is softened and finished in a mirror-surface fashion, and the core end face is formed in a predetermined shape such as lens form or the like has been used.

Herein, generally as shown in FIG. 10, a plastic optical fiber 50 comprises a core 51 consisting of high purity polymethacrylate resin (PMMA) disposed at the center, a clad 52 consisting of special fluororesin that covers peripheral surface of the core 51, and a jacket (cover) that covers the peripheral surface of the clad 52. A light that enters from the one core end face of the core 51 emitted from a light source 70 is totally reflected on the boundary between the core 51 and clad 52, and comes out from the other core end face.

In the case of the conventional end face treatment method for treating a plastic optical fiber end 53, a softened core 51 expands in the direction of the core side face 51b because the core end face is heated and pressed against the mold 62 simultaneously, the expansion is a problem.

To avoid the above-mentioned problem, it is required that a member to be mounted is mounted so as to avoid the expansion portion of the core side face 51b when the plastic optical fiber end 53 is inserted into the connecting parts such as light branch and coupler.

In particular, in the case that a plastic optical fiber end 53 is inserted into a thin hole formed at the tip of a ferrule by use of the connection member such as ferrule (inner ring) not shown in the drawing, it is required that not only the core end face 51a but also the expanded portion of the core 51 is projected from the ferrule end face, the accurate positioning of the plastic optical fiber end 53 is difficult, and it is a problem.

SUMMARY OF THE INVENTION

It is the object of the present invention to provide a treatment method and a treatment device in which the expanded portion is not formed on the core side face when a plastic optical fiber end is softened and fused, and the end face of the plastic optical fiber end is finished in a mirror-surface fashion in the form of a predetermined shape.

In the first solving means to solve at least one of the above-mentioned problems, the core end face of a plastic optical fiber end is pressed on a mold that is heated to a certain temperature to soften and fuse the core end face and to transfer the transfer face of the mold on the core end face.

The second solving means comprises a step for pressing the core end face of a plastic optical fiber end on the transfer face of a heated mold, a step for separating the core end face from the mold and cooling the core end face naturally, and a step in which pressing/separating between the core end face and the transfer face of the mold is repeated intermittently to deform the shape of the core end face gradually and to transfer the transfer face of the mold.

In the third solving means, the core end face is formed in the lens face shape.

In the fourth solving means, a step in which the cover of the plastic optical fiber end is removed to expose the core end face is provided.

In the fifth solving means, a step in which the clad of the core end face of the plastic optical fiber end is removed is provided.

The sixth solving means is provided with a chuck member for fixing the plastic optical fiber end, a guide member for guiding the core end face of the plastic optical fiber end, a mold having a transfer face for treating the core end face in the form of a predetermined shape, a heating unit for heating the mold to a certain temperature, and a moving unit for moving the core end face of the plastic optical fiber end and the transfer face of the mold to the position where both are pressed each other and separated, wherein the plastic optical fiber end is fixed by means of the chuck member and the guide member, and the mold is heated by means of the heating unit, the moving unit is reciprocated repeatedly to thereby transfer the transfer face of the mold on the core end face gradually.

BRIEF DESCRIPTION OF THE DRAWINGS

FIG. 8E is a partial schematic cross sectional view of a plastic optical fiber end face treatment device in accordance with one embodiment of the present invention showing the core end face and the transfer face of the mold again separated.

DETAILED DESCRIPTION OF THE PREFERRED EMBODIMENTS

An end face treatment method and a treatment device for treating a plastic optical fiber end in accordance with one embodiment of the present invention will be described in detail hereinafter with reference to the drawings.

Figure 1:
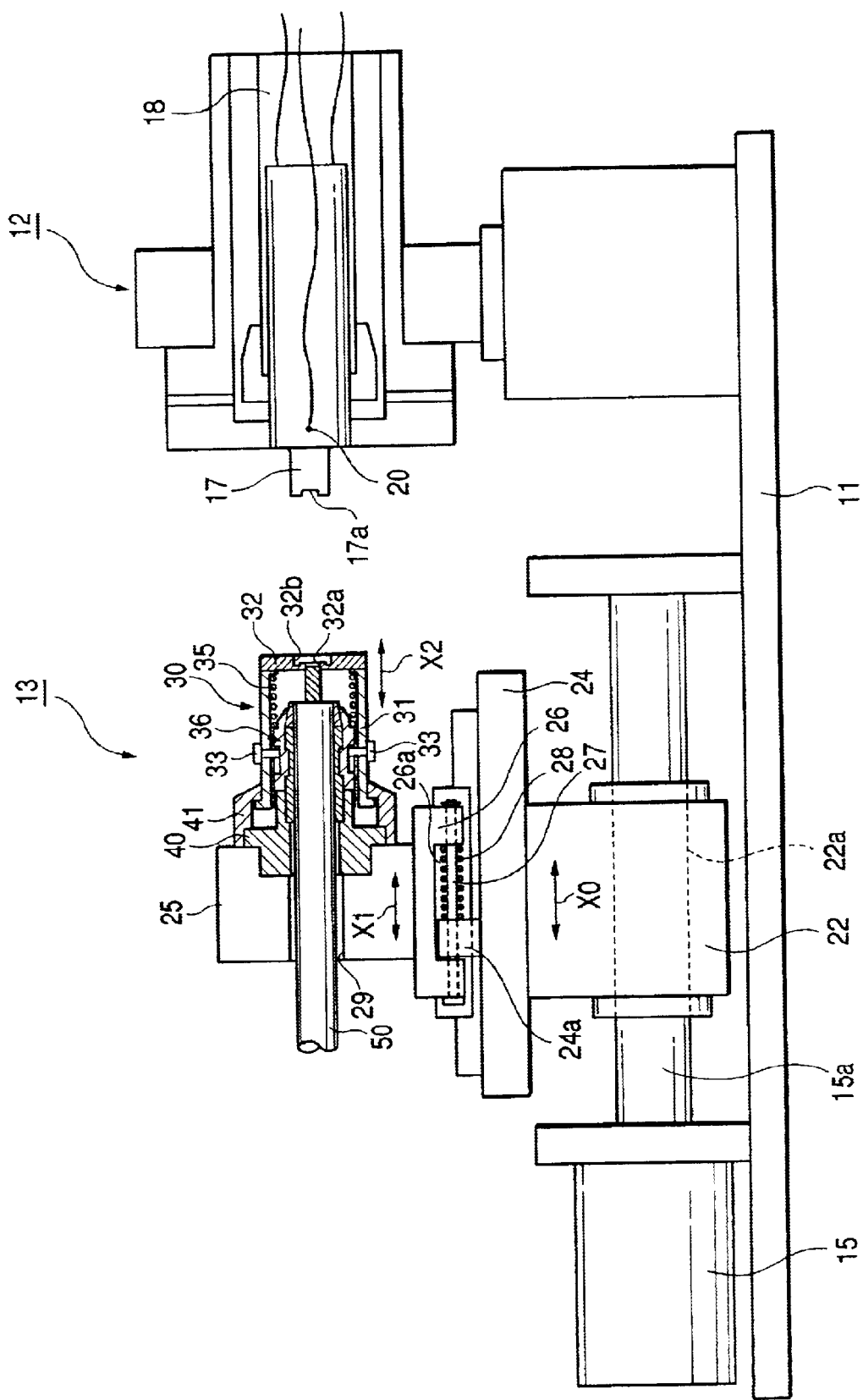
FIG. 1 is a schematic cross sectional view of a plastic optical fiber end face treatment device in accordance with one embodiment of the present invention.

FIG. 1 is a schematic cross sectional view of an end face treatment device for treating a plastic optical fiber in accordance with the present invention.

As shown in FIG. 1, the end treatment device comprises a fixing unit 12 mounted and fixed on a flat base table 11, a moving unit 13 supported movably with respect to the base table 11 disposed with facing to the fixing unit 12, and a control motor 15 placed on the base table 11 that is engaged with a part of the moving unit 13 and has a rotatable screw shaft 15a.

The fixing unit 12 is provided with a cylindrical mold 17 consisting of hard metal having a transfer face 17a for transferring in the form of lens face, a heating device 18 such as a heater for heating the mold 17, and a thermocouple 20 that is mounted on the mold 17 and served as a sensor to control the temperature of the heating device 18 constant.

The moving unit 13 is provided with a metal actuator 22 movable in the horizontal direction (in the drawing, in the direction XO), and the actuator is provided with a screw-shaped hole 22a that passes through the center.

A metal flat placing plate 24 is fixed to the actuator 22 to form a piece. The placing plate 24 has a regulation section 24a that projects upward and the regulation section has a through hole 24b (refer to FIG. 2) through the center.

A slide member 25 consisting of metal has a recess 26a on the bottom 26, a long metal shaft 27 is provided so as to penetrate through the recess 26a, and a coil spring 28 is provided so as to wind around the shaft.

The coil spring 28 is pressing the regulation section 24a by means of the elastic force usually, and pressed against the position where the regulation section 24a is in contact with the one end of the recess 26a on the bottom 26 (left side on the drawing) with interposition of the shaft 27 mounted slidably in the through hole 24b of the regulation section 24a.

At the center of the slide member 25, an insertion hole 29 is formed for insertion of a plastic optical fiber 50, and on the extension line of the insertion hole 29, a chucking mechanism 30 mounted together with the slide member 25 is provided.

Next, the chucking mechanism will be described herein under.

Figure 2:
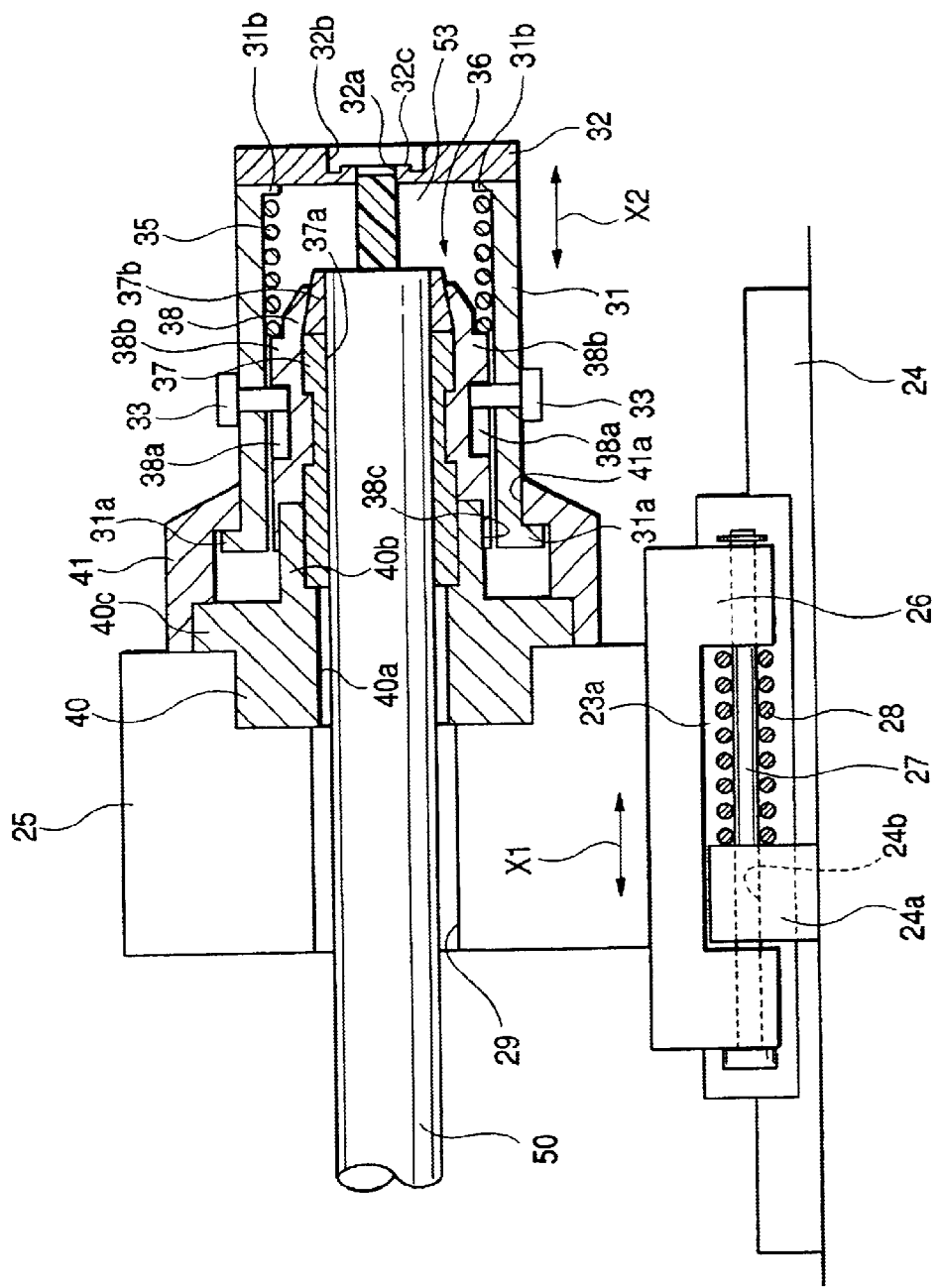
FIG. 2 is a partially enlarged cross sectional view of the plastic optical fiber end face treatment device in accordance with one embodiment of the present invention.

FIG. 2 is a partially enlarged cross sectional view of an end face treatment device for treatment of a plastic optical fiber 50.

The chucking mechanism 30 is provided with a cylindrical metal housing 31, a flange 31a that extends outside is provided on the periphery of the end of the housing 31, and a collar 31b that extends slightly inside is provided on the periphery of the other end.

Furthermore, on the other end of the housing 31, a disk-shaped core guide member 32 is mounted together with the collar 31b so as to overlap each other, a circular guide hole 32a that penetrate through the thickness of the plate at the center is formed on the core guide member 32, and the periphery of the guide hole 32a is widened outside to form a counter bore 32b. The periphery of the guide hole 32a is projected in the counter bore 32b, and a ridge periphery 32c having a flat face is provided. Furthermore, at least two circular holes are formed through the peripheral wall of the housing 31, and set screws 33 are mounted on these circular holes inward.

In the above-mentioned housing 31, a coil spring 35 is contained along the collar 31b and the outer peripheral wall, and a collet chuck 36 is contained so as to hold the coil spring 35 in-between.

The collet chuck 36 consisting of metal or high rigidity synthetic resin is provided with a circular sleeve 37 having a hole 37a at the center and a generally cylindrical locknut 38 consisting of the same material as used for the sleeve 37 disposed rotatably in contact with the outer peripheral wall of the sleeve 37.

The one peripheral end of the above-mentioned sleeve 37 is divided into several portions, and a plurality of tapered nails 37b with thin tip are provided.

A recessed notch groove 38a is formed on the periphery of the outer peripheral wall of the above-mentioned locknut 38, and a tapered clamp 38b having a thin tip extending from the notch groove 38a is provided. On the other end of the outer peripheral wall of the locknut 38, an extension 38c that extends along the outer peripheral wall is provided.

When an end 53 of a plastic optical fiber is inserted into the hole 37a of the sleeve 37, the plastic optical fiber end 53 is clamped with the locknut 38 that covers the sleeve 37, and the plastic optical fiber end 53 is mounted and fixed.

Next, a chuck base 40 comprising a metal cylindrical member has a through hole 40a at the center, a barrel 40b at the one end of the through hole 40a in a piece, and a collar 40c at the center of the outer peripheral wall.

The metal locknut 41 is a conical cylindrical member having a hole 41a at the center, and the flange 31a of the housing 31 is stopped slidably on the inside wall of the hole 41a.

Next, the end face treatment method for treatment a plastic optical fiber end 53 will be described herein under with reference to FIG. 3.

Figure 3A:
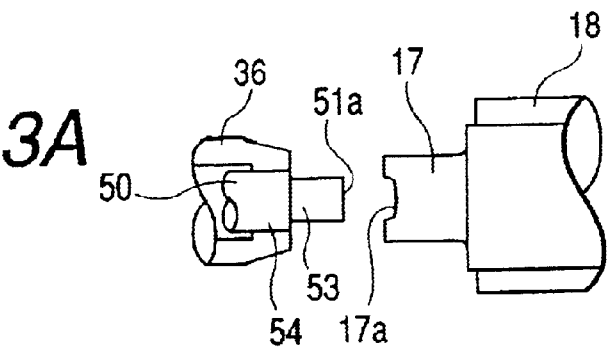
FIG. 3A is a schematic cross sectional view of a plastic optical fiber end face treatment method in accordance with one embodiment of the present invention showing the plastic optical fiber end face prior to insertion of the plastic optical fiber end face into the transfer face of the mold.

As shown in FIG. 3A, first the one end of the plastic optical fiber 50 is inserted into the collet chuck 36, the jacket of the plastic optical fiber 50 is held at the predetermined position with the collet chuck 36, and a core end face 51a of the plastic optical fiber end 53 is exposed.

The mold 17 is disposed with facing to the core end face of the plastic optical fiber end 53, and the heating device 18 heats the mold 17 to a predetermined temperature of, for example, approximately 120° C. to 200° C., and more preferably around 170° C. in the form of lens face (aspheric surface).

Figure 3B:
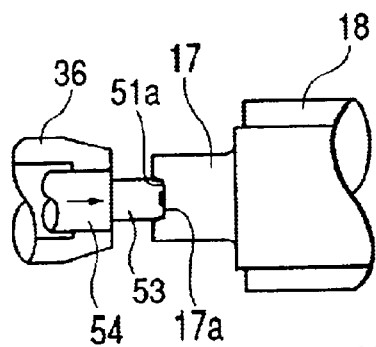
FIG. 3B is a schematic cross sectional view of a plastic optical fiber end face treatment method in accordance with one embodiment of the present invention showing the plastic optical fiber end face during an insertion of the plastic optical fiber end face into the transfer face of the mold.

Next, as shown in FIG. 3B, the core end face is moved toward the mold 17 together with the collet chuck 36 that is served as the chucking mechanism 30 while the jacket 54 of the plastic optical fiber 50 is being held with the collet chuck 36 to thereby bring the core end face of the plastic optical fiber end 53 in contact with the transfer face 17a of the mold 17.

The core end face 51a is partially softened and fused around the contact position and deformed so as to fit the transfer face 17a having a configuration of, for example, lens face in the state that the core end face 51a is pressed loosely on the heated mold 17.

Figure 3C:
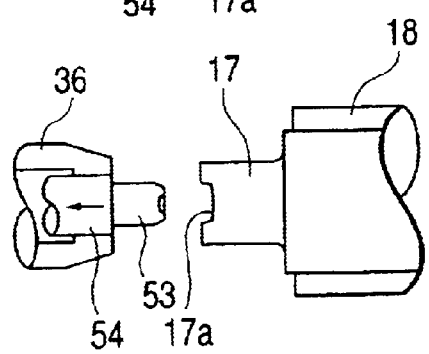
FIG. 3C is a schematic cross sectional view of a plastic optical fiber end face treatment method in accordance with one embodiment of the present invention showing the plastic optical fiber end face after an insertion of the plastic optical fiber end face into the transfer face of the mold when the plastic optical fiber end face and the transfer face of the mold are separated.

Next, as shown in FIG. 3C, the plastic optical fiber end 53 is separated from the transfer face 17a of the mold 17 together with the collet chuck 36 temporarily. The portion of the core end face 51a that has been softened and fused of the plastic optical fiber end 53 that has been separated from the transfer face 17a is cooled naturally and solidified.

Figure 3D:
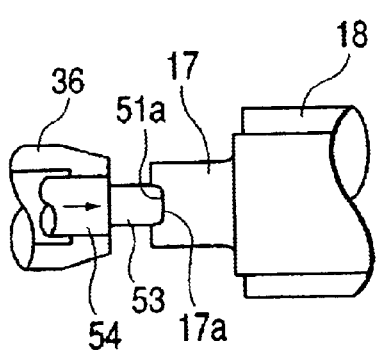
FIG. 3D is a schematic cross sectional view of a plastic optical fiber end face treatment method in accordance with one embodiment of the present invention showing the plastic optical fiber end face during a later insertion of the plastic optical fiber end face into the transfer face of the mold.

Next, as shown in FIG. 3D, the plastic optical fiber end 53 is moved toward the mold 17 again together with the collet chuck 36 and the pressed loosely on the heated mold 17, the slightly deformed core end face is softened and fused again, and the core end face is deformed so as to be deformed more fittingly to the predetermined curved face form than the first time deformation.

Figure 3E:
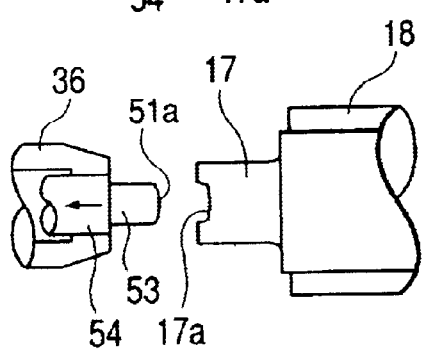
FIG. 3E is a schematic cross sectional view of a plastic optical fiber end face treatment method in accordance with one embodiment of the present invention showing the plastic optical fiber end face after a later insertion of the plastic optical fiber end face into the transfer face of the mold when the plastic optical fiber end face and the transfer face of the mold are again separated.

Furthermore, as shown in FIG. 3E, the core end face of the plastic optical fiber end 53 is separated from the mold 17 and cooled naturally and solidified.

A series of operations shown in FIG. 3B to in FIG. 3E is repeated 20 to 100 times, preferably approximately 70 times intermittently for obtaining the lens face (aspheric surface), the pressure applied on the core end face 51a is 0.5 kgf to 3 kgf, preferably 2 kgf for obtaining the lens face (aspheric surface). By applying heating pressure to form the core end face gradually as described hereinabove, the same configuration as that of the transfer face 17a of the mold 17 is formed on the core end face.

Figure 4:
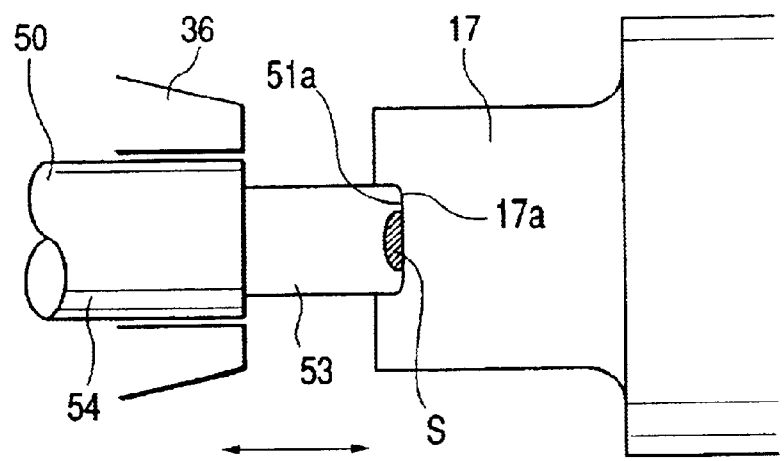
FIG. 4 is a schematic cross sectional view for describing trapped air releasing in the plastic optical fiber end face treatment method in accordance with one embodiment of the present invention.

By the way, as shown in FIG. 4, trapped air S that is formed by enclosing air or gas in the initial stage of the end face treatment is formed on the core end face 51a. However, in the case of the plastic optical fiber treatment device of the present invention, because contact/separation operation is repeated many times so as to obtain the end face of the predetermined configuration such as lens face while the core end face is heated and pressed intermittently and the trapped air or gas is released gradually, the end face that is finished in a mirror-surface fashion in the form of a predetermined shape and has no trapped air S can be obtained.

At that time, the interval (cycle) of repeated pressing is a constant interval in a range from 0.1 sec to 2 sec. In the case of the lens face (aspheric surface), the pressing interval is preferably 0.7 sec.

Next, it is required to peel off the clad 52 of the plastic optical fiber end 53 from the core end face in order to treat the end face most preferably in forming the core end face of the plastic optical fiber end 53 of the present invention.

Figure 5:
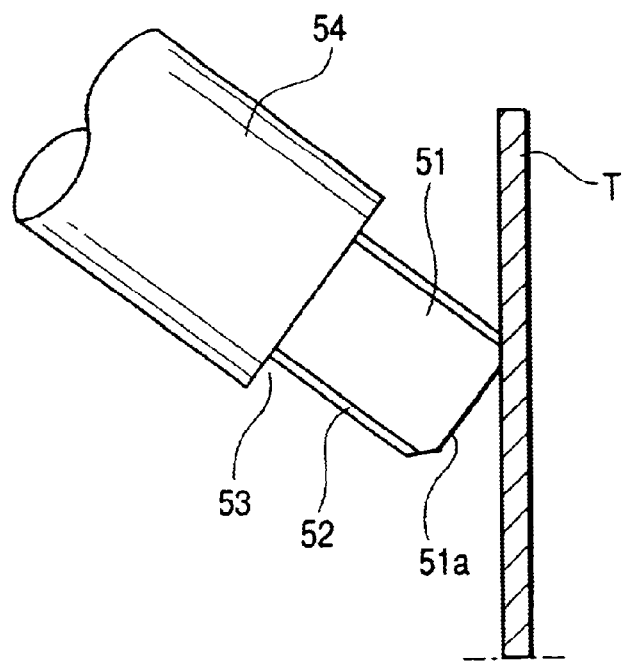
FIG. 5 is a schematic cross sectional view for describing the chamfering of a plastic optical fiber in accordance with one embodiment of the present invention.

The method will be described hereinunder. As shown in FIG. 5, the jacket 54 is removed previously by use of a tool at the tip of the plastic optical fiber end 53 to expose the core 51 and clad 52.

The plastic optical fiber end 53 is disposed inclined by fixing it with a chuck not shown in the drawing with respect to the rotation axis of a grinding stone T, the clad 52 that covers the core end face 51a is brought into touch with the grinding stone T that is rotating at a high speed so that the clad 52 is ground, and the clad 52 is removed from the end and only the core 51 remains at the core end face 51a. Simultaneously, the core end face is chamfered slant on the entire periphery with rotation of the plastic optical fiber 50 held by a chuck not shown in the drawing at a predetermined rotation speed round the axis center of the core 51, and the needless clad 52 is removed from the core end face 51 of the end.

Figure 6:
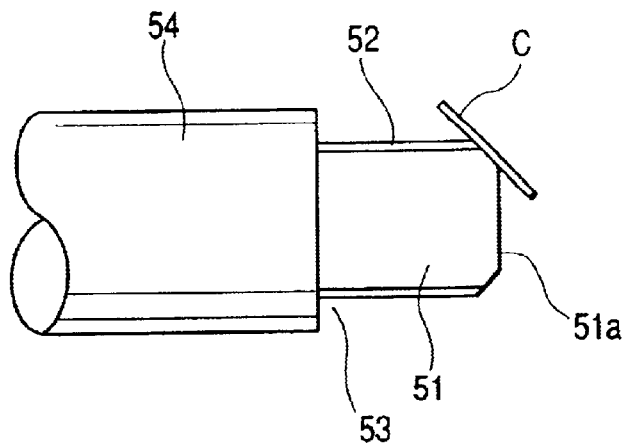
FIG. 6 is a schematic cross sectional view for describing the chamfering of a plastic optical fiber in accordance with one embodiment of the present invention.

FIG. 6 shows a method for chamfering the tip of the plastic optical fiber end 53 by use of a cutter C instead of the grinding stone T.

As shown in FIG. 6, the jacket is removed from the core end face 51a of the plastic optical fiber end 53, and the core 51 and the clad 52 are exposed.

The plastic optical fiber 50 held by a chuck not shown in the drawing is rotated slowly at a predetermined speed round the core axis center and the cutting blade of the cutter C is touched slant on the core end face, the core end face is cut on the entire periphery and chamfered, and the needless clad 52 is thereby removed from the core end face.

Figure 7A:
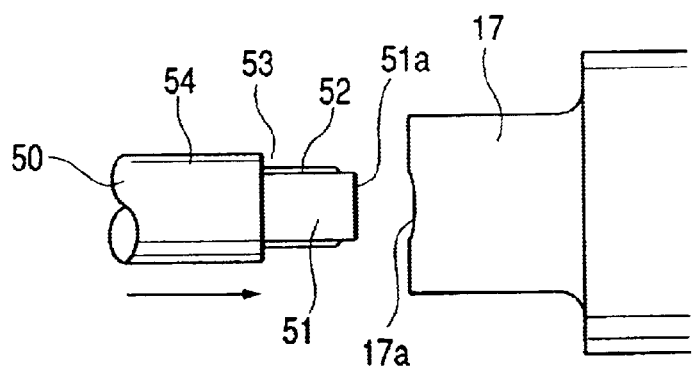
FIG. 7A is a schematic cross sectional view of a plastic optical fiber end face treatment method in accordance with one embodiment of the present invention showing the chamfered plastic optical fiber end face prior to insertion of the chamfered plastic optical fiber end face into the transfer face of the mold.

The end face treatment of the plastic optical fiber end 53 from which the clad 52 has been removed as described hereinabove will be described briefly. As shown in FIG. 7A, the clad 52 is removed from the peripheral portion of the exposed core end face by means of chamfering as described hereinabove.

The plastic optical fiber 50 is fixed firmly on the moving unit 13 by means of the collet chuck 36 (refer to FIG. 2), and pressed against the transfer face 17a of the mold 17 that is heated at a certain temperature.

Figure 7B:
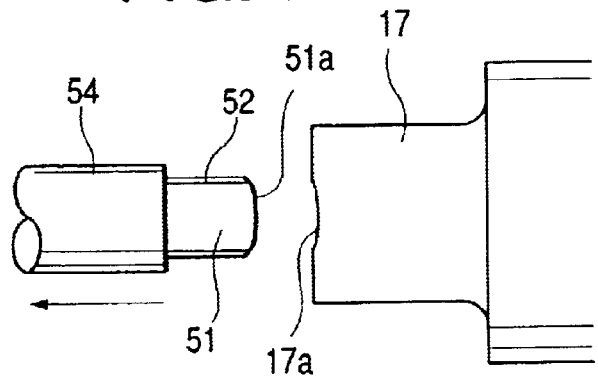
FIG. 7B is a schematic cross sectional view of a plastic optical fiber end face treatment method in accordance with one embodiment of the present invention showing the chamfered plastic optical fiber end face during an insertion of the chamfered plastic optical fiber end face into the transfer face of the mold.

As shown in FIG. 7B, the core end face of the plastic optical fiber end 53 is heated and pressed against the mold 17 intermittently and repeatedly to thereby be formed in the desired shape corresponding to the shape of the transfer face 17a such as lens face shape. The clad 52 does not cover the core end face 51a, and does not hinder the core end face 51a from being finished in a mirror-surface fashion.

Next, the operation of the plastic optical fiber end face treatment device of the present invention will be described herein under with reference to FIG. 8.

FIG. 8 shows schematic cross sectional views for illustrating successive steps of the plastic optical fiber end face treatment.

In the plastic optical fiber end 53, the jacket 54 is removed previously from the core 51 and the clad 52 that covers the core 51, and the clad 52 is removed from the core end face 51a by chamfering the periphery of the core 51 and the clad 52.

Figure 8A:
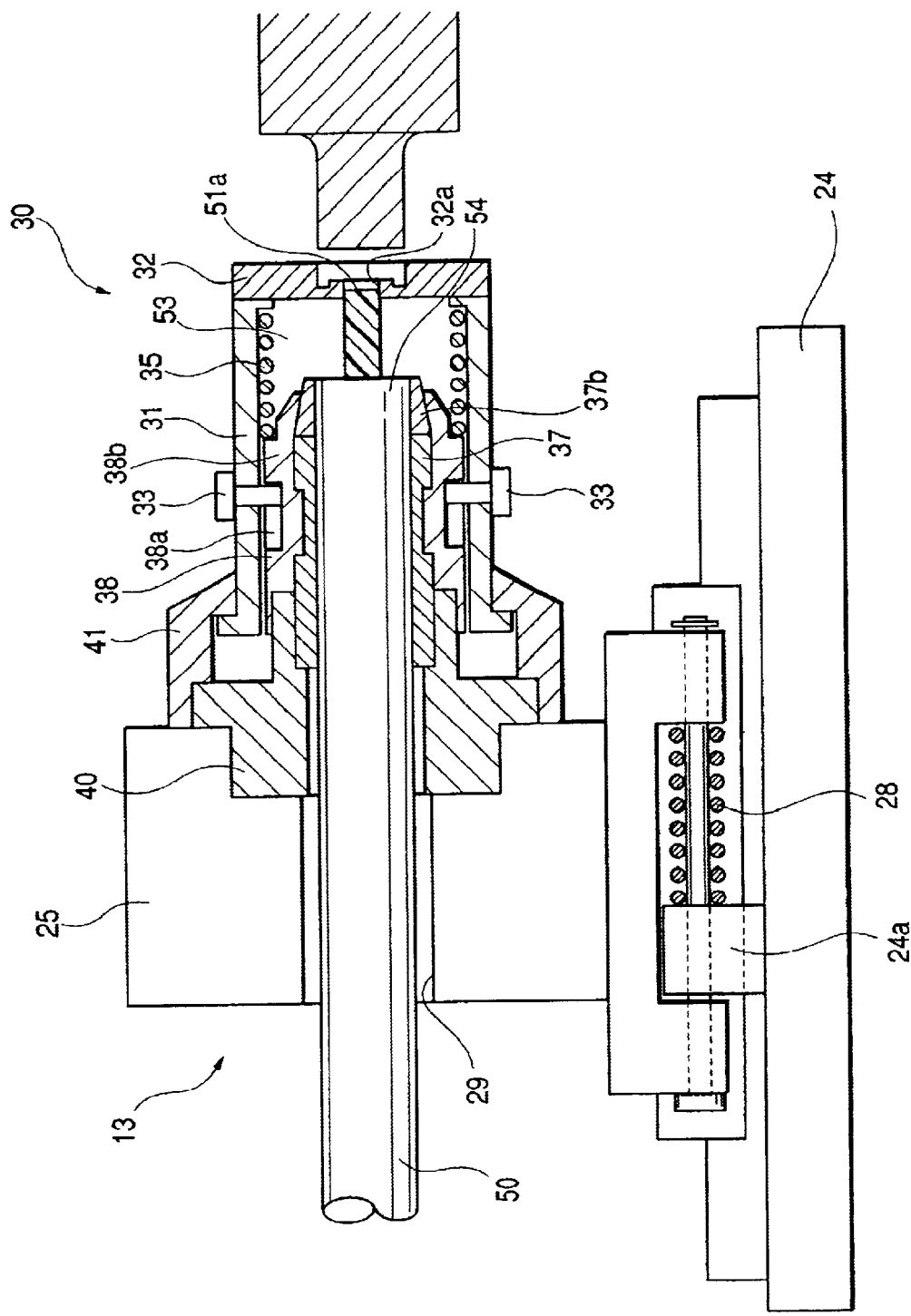
FIG. 8A is a partial schematic cross sectional view of a plastic optical fiber end face treatment device in accordance with one embodiment of the present invention showing the plastic optical fiber end face inserted into the guide hole of the guide member.

As shown in FIG. 8A, the plastic optical fiber end 53 is inserted though the insertion hole 29 of the slide member 25, the plastic optical fiber end 53 is positioned so that the core end face of the plastic optical fiber end 53 is located at the guide hole 32a of the core guide member 32 and the jacket portion is located at the nails 37b of the sleeve 37.

Next, when a fixing screw 33 is turned together with the housing 31 round the axis, the fixing screw 33 is stopped in the notch groove 38a on the outer peripheral wall of the locknut 38, and the locknut 38 is turned together with the housing 31. The locknut 38 is moved toward the slide member 25 side by means of a screw, not shown in the drawing, mounted on the locknut 38 and chuck base 40, the nails 37b of the sleeve 37 is tightened by means of the locking member 38b, and the jacket of the plastic optical fiber end 53 is tightened.

At that time, the core end face of the plastic optical fiber end 53 is inserted into the guide hole 32a of the guide member 32, and located at the predetermined position.

Figure 8B:
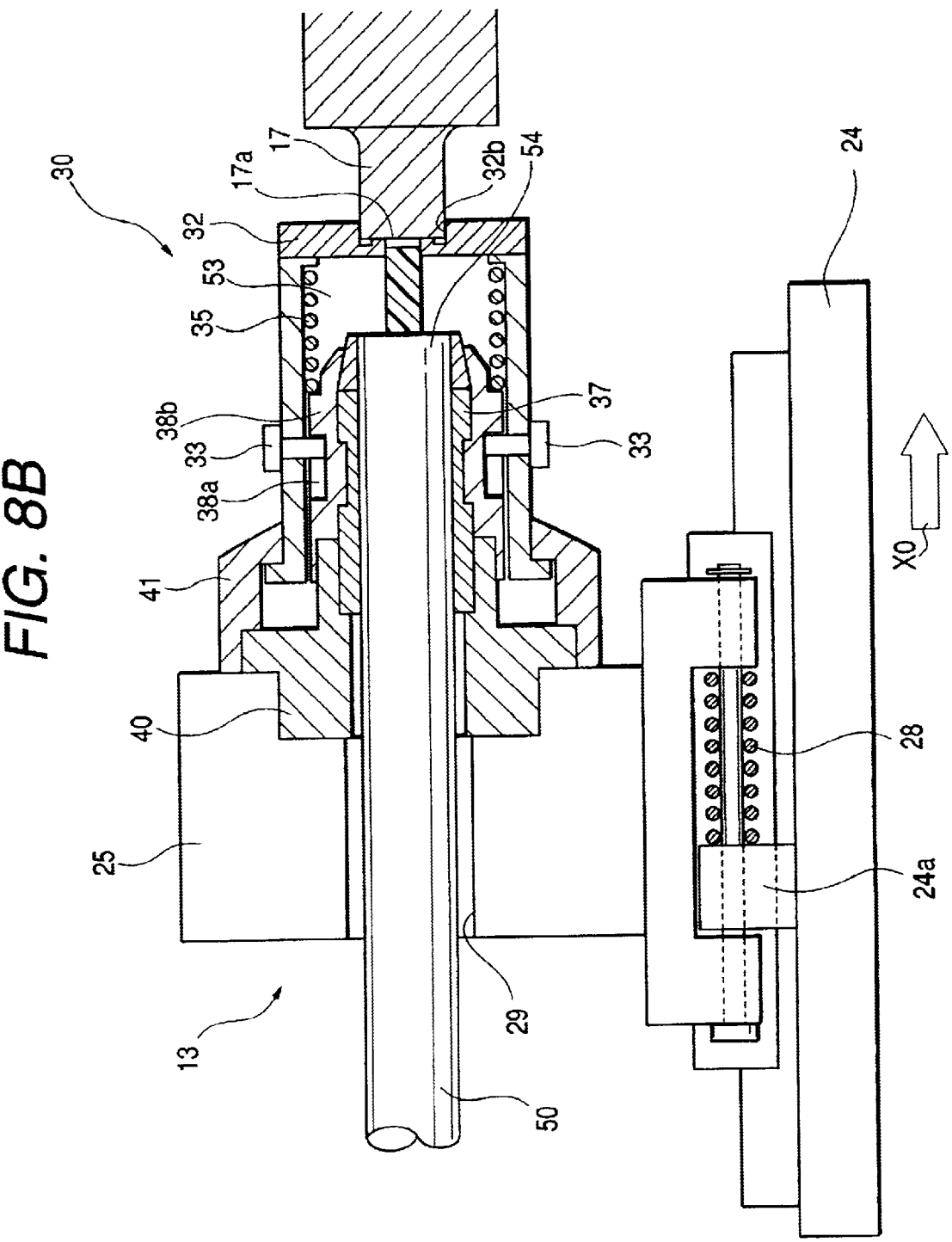
FIG. 8B is a partial schematic cross sectional view of a plastic optical fiber end face treatment device in accordance with one embodiment of the present invention showing the transfer face of the transfer mold contacting the projectional periphery of the core guide member.

Next, as shown in FIG. 8B, as the control motor 15 (refer to FIG. 1) is driven rotationally, the moving unit 13 and the chucking mechanism 30 mounted on the moving unit 13 are moved together toward the mold 17 (in the arrow direction X0 in the drawing) along the shaft 15a (refer to FIG. 1).

The transfer face 17a of the mold 17 is brought into contact with the projectional periphery 32c in the counter bore 32b of the core guide member 32 with a predetermined pressure.

Figure 8C:
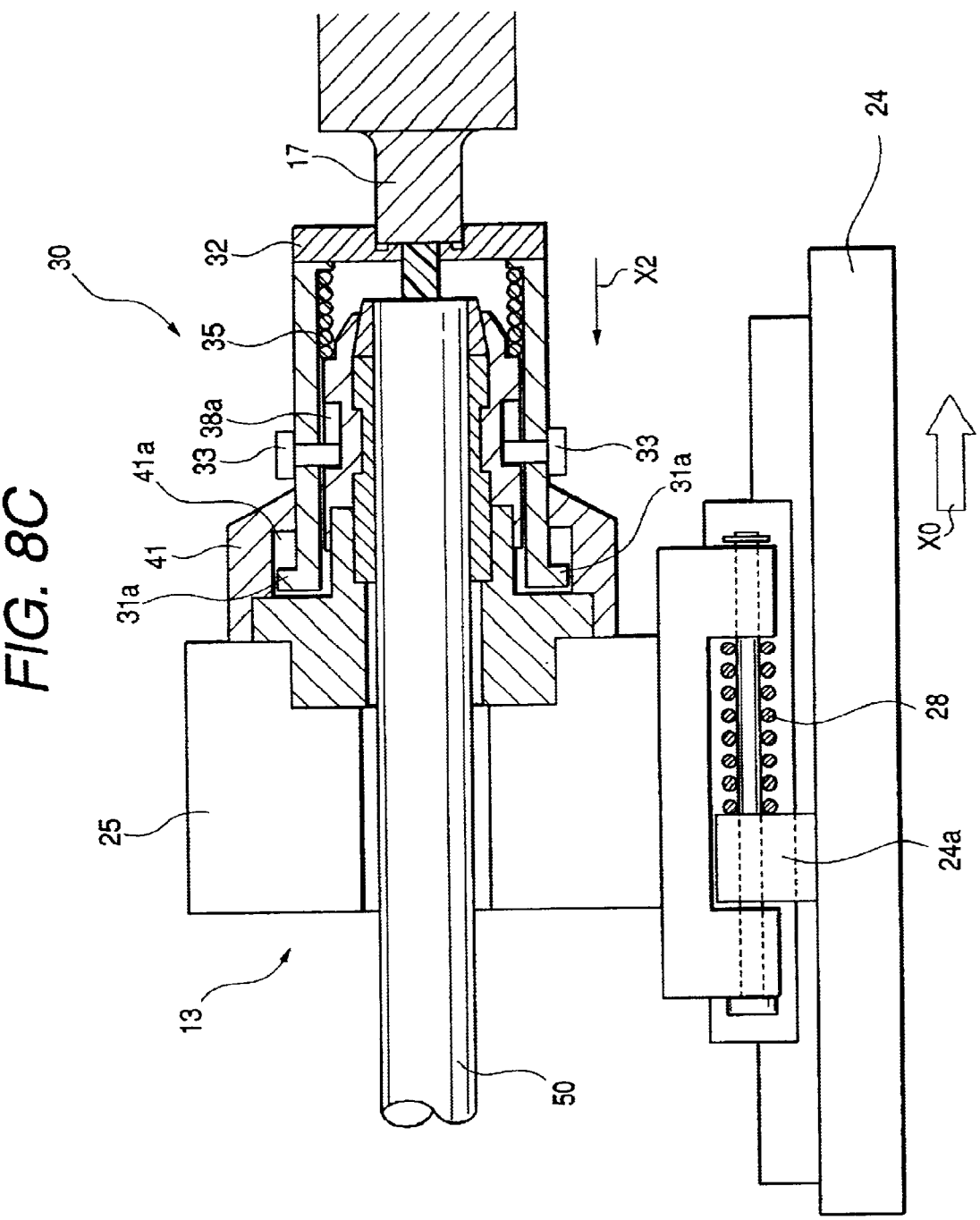
FIG. 8C is a partial schematic cross sectional view of a plastic optical fiber end face treatment device in accordance with one embodiment of the present invention showing the transfer face of the mold pressing the core end face.

Next, as shown in FIG. 8C, as the control motor 15 is further driven rotationally, the moving unit 13 is moved toward the mold 17 (in the arrow direction X0 in the drawing), the transfer face 17a of the mold 17 presses the core end face 51a of the plastic optical fiber end 53 and the projectional periphery 32c in the counter bore 32b of the core guide member 32 to thereby presses the housing 31 in the direction (arrow direction X2 in the drawing) opposite to the moving direction (arrow direction X1 in the drawing) of the moving unit 13 against the pressing force of the coil spring 35.

Therefore, the flange 31a of the housing 31 is moved slidingly toward the inner side in the hole 41a of the locknut 41.

Figure 8D:
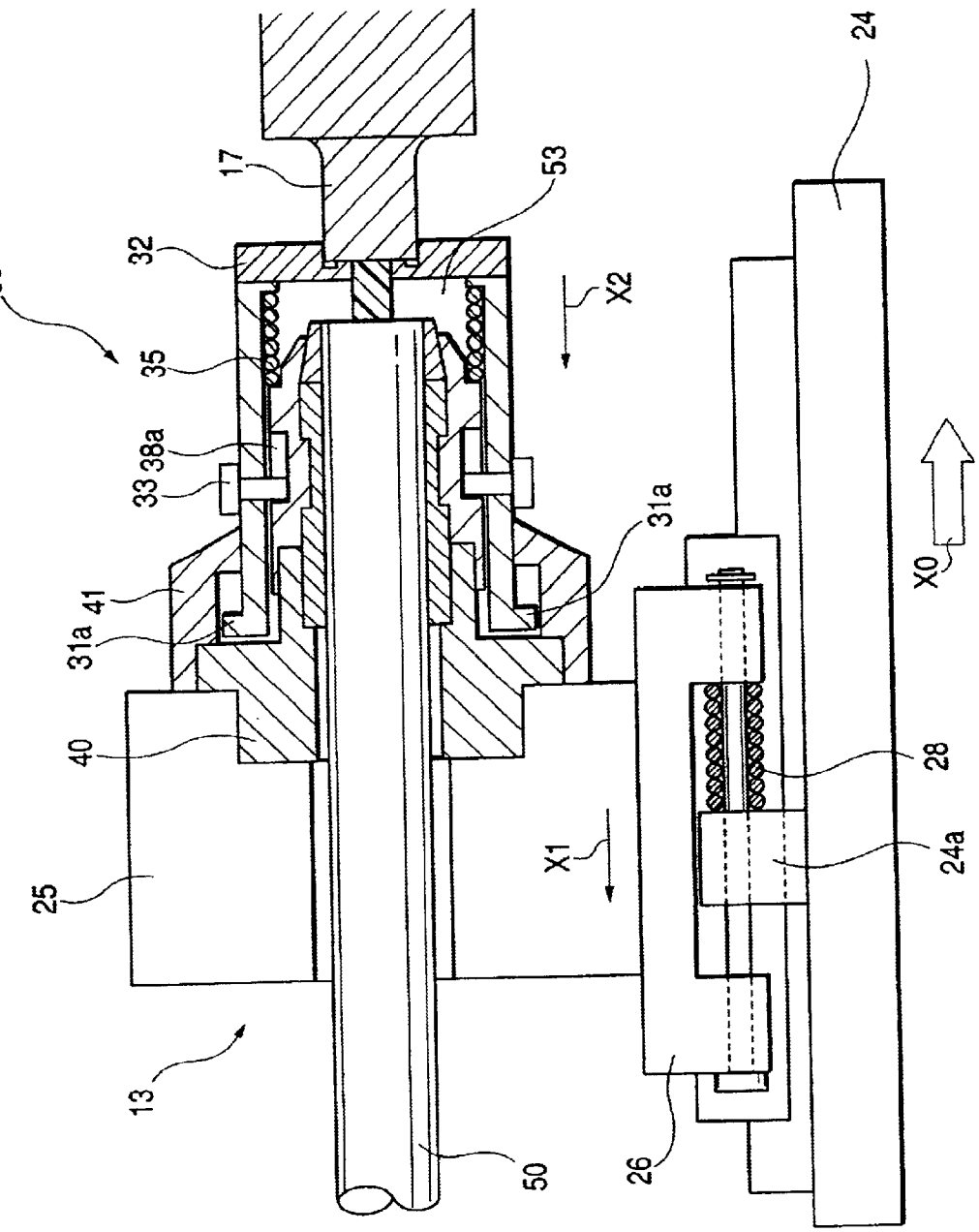
FIG. 8D is a partial schematic cross sectional view of a plastic optical fiber end face treatment device in accordance with one embodiment of the present invention showing the transfer face of the mold pressing the core end face with the coil spring compressed.
Figure 9:
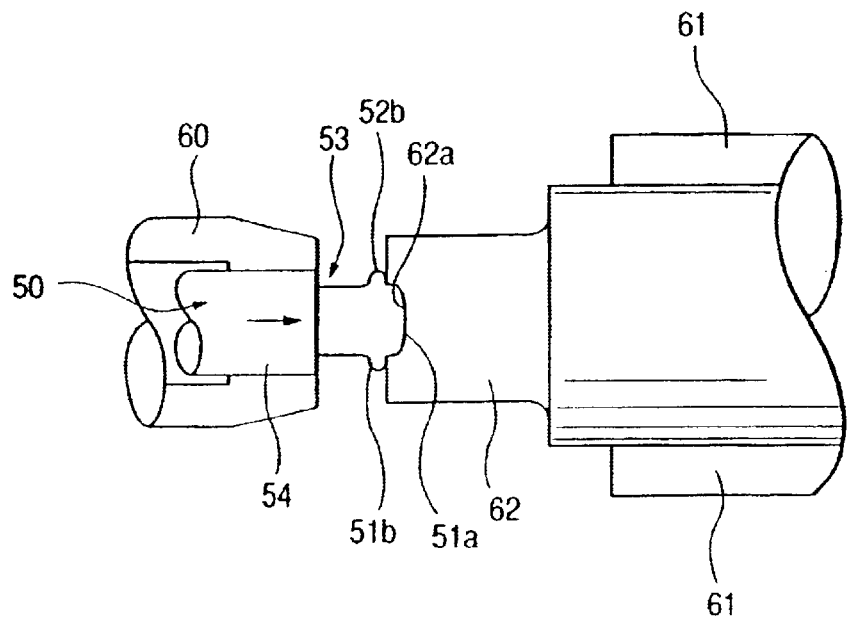
FIG. 9 is a schematic cross sectional view for describing a conventional plastic optical fiber end face treatment method.
Figure 10:
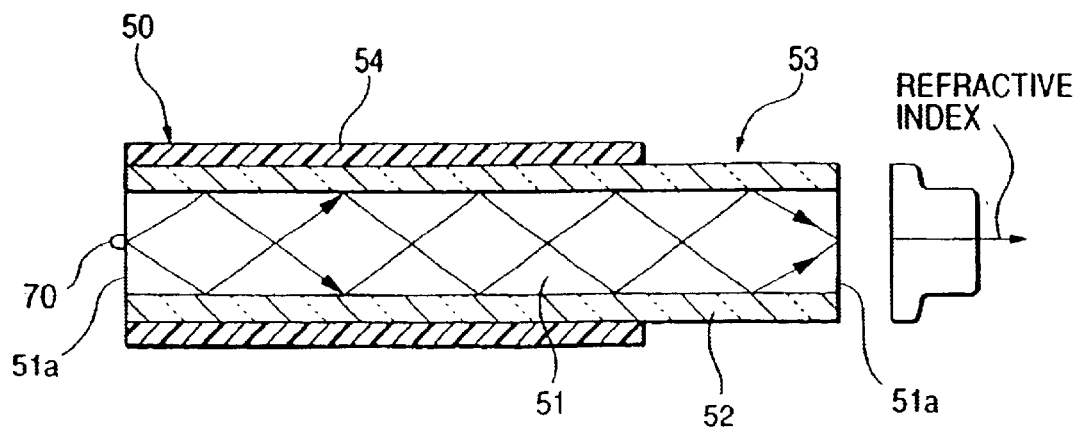
FIG. 10 is a schematic cross sectional view for describing a plastic optical fiber.

Next, as shown in FIG. 8D, as the control motor 15 is further driven rotationally, the moving unit 13 is moved further toward the mold 17 (in the arrow direction X0 in the drawing), and the housing 31 is thereby moved further in the direction (in the arrow direction X2 in the drawing) opposite to the moving direction of the moving unit 13 against the pressing force of the coil spring 35.

Thereby, the core end face 51a is brought into contact with the transfer face 17a of the mold 17 and presses the transfer face 17a, and the chucking mechanism 30 is pressed by means of the pressing force. As the result, the bottom plate 26 of the slide member 25 moves in the arrow direction X1 in the drawing against the pressing force of the coil spring 28 to thereby separate the regulation section 24a of the placing plate 24 from the one end of the recess 26a of the slide member 25. As described hereinabove, the pressing force exerted on the core end face 51a of the plastic optical fiber end 53 is controlled to be constant, and the buffer action is working so that the pressing force does not break the plastic optical fiber end 53.

Next, as shown in FIG. 8E, when the shaft 15a of the control motor 15 (refer to FIG. 1) is driven rotationally in the opposite direction, the placing plate 24 is moved in the arrow direction X1, but the moving unit 13 and the chucking mechanism 30 remain pressed and held by means of the coil springs 28 and 35 in the direction of the mold 17 (in the arrow direction X1) initially.

Then, the regulation section 24a of the slide member 25 is brought into contact with the other end (wall) in the recess 26a of the bottom plate 26 by means of the pressing force of the coil spring 28 and returns to the original position, and returns to the original position so that the locknut 38 is brought into contact with the fixing screw 33 by means of the coil spring 35, and the whole housing 31 returns to the original position that was when pressed against the mold 17.

The core end face of the plastic optical fiber end 53 is separated from the transfer face 17a of the mold 17, and a series of operations as described hereinabove is repeated to thereby complete the end face treatment of the core end face.

By applying the operation described hereinabove, the plastic optical fiber end 53 is formed accurately in the desired shape without needless deformation such as extrusion. Fluororesin material of the clad 52 of the plastic optical fiber end 53 does not adhere on the core end face of the plastic optical fiber end 53 and the core end face 51a is protected from deterioration.

The optical fiber end face treatment method and the end face treatment device of the present invention are by no means limited by the present embodiment. For example, the transfer face of the mold may be a lens face or may be a flat face.

Because according to the optical fiber end face treatment method described hereinbefore, the core end face of the plastic optical fiber end is pressed intermittently on the mold that is heated to a certain temperature so as to be softened and fused and so that the transfer face of the mold is transferred on the core end face to thereby mold the core end face gradually by heating and pressing the core end face intermittently, the portion that is softened in one operation is little, and the transfer area is increased gradually. Therefore, the softened core end face will not be extruded from the mold, and the desired shape is obtained without after-treatment.

Because the plastic optical fiber end face treatment method comprises a step for pressing the core end face of the plastic optical fiber end on the transfer face of the heated mold, a step for separating the core end face from the mold and cooling the core end face naturally, and a step in which contacting/separating between the core end face and the transfer face of the mold is repeated intermittently to deform the shape of the core end face gradually to thereby transfer the transfer face of the mold, the end face treatment of the plastic optical fiber is carried out without an additional cooling device for cooling the core end face. The trapped air is released because of repeated pressing/separating operation, and the transfer face is formed accurately.

Furthermore, because the core end face is formed in the lens shape, a plastic optical fiber with a lens face can be used without the additional secondary treatment.

Furthermore, because a step in which the cover of the plastic optical fiber end is removed and the core end face is exposed is provided, the cover will not cover the core end face, the core end face can be treated easily.

Furthermore, because a step in which the clad of the plastic optical fiber end is removed is provided, the clad will not cover the core end face by molding, the core end face is treated accurately.

Furthermore, because the end face treatment device for treating the core end face of the plastic optical fiber end of the present invention is provided with a chuck member for fixing the plastic optical fiber end, a guide member for guiding the core end face of the plastic optical fiber end, a mold having a transfer face for forming the core end face in a predetermined shape, a heating unit for heating the mold at a certain temperature, and a moving unit for moving the core end face of the plastic optical fiber end and the transfer face of the mold to the position where both are pressed each other and separated, wherein the plastic optical fiber is fixed by means of the chuck member and the guide member, the mold is heated by means of the heating unit, the moving unit is reciprocated repeatedly to thereby transfer the transfer face on the core end face gradually, the mold can be reciprocated repeatedly, the core end face is heated and pressed intermittently by the mold to thereby form the transfer face on the core end face gradually, the portion that softened at one operation is little, and the transfer area can be increased gradually. As the result, the softened core end face will not be extruded from the mold, and a desired shape can be formed without after-treatment.

What is claimed is:

1. A plastic optical fiber end face treatment method comprising: pressing a core end face of a plastic optical fiber end intermittently on a mold heated to a certain temperature to soften and fuse the core end face and thereby transfer a transfer face of the mold on the core end face;

removing a cover of the plastic optical fiber end to expose the core end face; and chamfering a peripheral portion of clad of the core end face of the plastic optical fiber end to remove said peripheral portion of clad of the core end face, the chamfering comprising cutting the peripheral portion of the clad of the core end face.

2. The plastic optical fiber end face treatment method as claimed in claim 1 further comprising;

separating the core end face from the mold and cooling the core end face naturally, and intermittently repeating the pressing/separating between the core end face and the transfer face of the mold to deform a shape of the core end face gradually and to transfer the transfer face of the mold.

3. The plastic optical fiber end face treatment method as claimed in claim 1, wherein the core end face is formed in a lens face shape.

4. The plastic optical fiber end face treatment method as claimed in claim 2, wherein the core end face is formed in a lens face shape.

5. The plastic optical fiber end face treatment method as claimed in claim 1, wherein cutting the core end face further comprises utilizing a cutter to cut the peripheral portion of the clad of the core end face.

6. The plastic optical fiber end face treatment method as claimed in claim 1, wherein chamfering further comprises applying a grinding stone to the clad to remove the peripheral portion of the clad of the core end face.

7. A plastic optical fiber end face treatment method comprising:

pressing a core end face of a plastic optical fiber end is pressed intermittently on a mold heated to a certain temperature to soften and fuse the core end face and thereby transfer a transfer face of the mold on the core end face;

intermittently repeating the pressing/separating between the core end face and the transfer face of the mold to deform a shape of the core end face gradually and to transfer the transfer face of the mold;

separating the core end face from the mold and cooling the core end face naturally;

removing a cover of the plastic optical fiber end to expose the core end face; and chamfering a peripheral portion of clad of the core end face of the plastic optical fiber end by utilizing a cutter to cut the peripheral portion of the clad of the core end face and removing the peripheral portion of clad of the core end face.

8. The plastic optical fiber end face treatment method as claimed in claim 7, wherein the core end face is formed in a lens face shape.

9. The plastic optical fiber end face treatment method as claimed in claim 7, wherein chamfering further comprises applying a grinding stone to the clad.

* * * * *